(12) United States Patent
Nagao et al.

(10) Patent No.: US 8,807,926 B2
(45) Date of Patent: Aug. 19, 2014

(54) TURBOCHARGER

(75) Inventors: Kenichi Nagao, Yokohama (JP); Isao Morita, Yokohama (JP); Satomi Unno, Yokohama (JP); Hiroki Ono, Tokyo (JP)

(73) Assignee: IHI Corporation (JP)

( * ) Notice: Subject to any disclaimer, the term of this patent is extended or adjusted under 35 U.S.C. 154(b) by 567 days.

(21) Appl. No.: 13/127,514

(22) PCT Filed: Nov. 5, 2009

(86) PCT No.: PCT/JP2009/005888
§ 371 (c)(1),
(2), (4) Date: May 4, 2011

(87) PCT Pub. No.: WO2010/052911
PCT Pub. Date: May 14, 2010

(65) Prior Publication Data
US 2011/0206500 A1 Aug. 25, 2011

(30) Foreign Application Priority Data
Nov. 5, 2008 (JP) ................................ P2008-284140

(51) Int. Cl.
*F01D 17/16* (2006.01)
(52) U.S. Cl.
USPC ........................................................ 415/158
(58) Field of Classification Search
USPC .......................................... 415/157, 158, 167
See application file for complete search history.

(56) References Cited

U.S. PATENT DOCUMENTS

| 4,324,526 | A | * | 4/1982 | Berchtold et al. | ............. | 415/48 |
| 4,741,666 | A | * | 5/1988 | Shimizu et al. | ............. | 415/158 |
| 2002/0094284 | A1 | | 7/2002 | Arnold | ............. | 417/407 |
| 2005/0220616 | A1 | | 10/2005 | Vogiatzis et al. | ............. | 415/208.1 |
| 2005/0226718 | A1 | | 10/2005 | Marcis et al. | ............. | 415/163 |

FOREIGN PATENT DOCUMENTS

| CN | 1680683 A | 10/2005 |
| JP | 62-138834 | 9/1987 |
| JP | 11-229815 | 8/1999 |
| JP | 11-257011 | 9/1999 |
| JP | 2000-018004 | 1/2000 |
| JP | 2000-120442 | 4/2000 |
| JP | 2002-147246 | 5/2002 |
| JP | 2003-301726 | 10/2003 |

(Continued)

OTHER PUBLICATIONS

Machine Translation of JP 2008-184971.*

(Continued)

*Primary Examiner* — Edward Look
*Assistant Examiner* — William Grigos
(74) *Attorney, Agent, or Firm* — Ostrolenk Faber LLP (57) ABSTRACT

A variable capacity type turbocharger includes a bearing housing which rotatably supports a turbine impeller; a turbine housing; and an exhaust nozzle, wherein the exhaust nozzle includes a pair of exhaust introduction walls forming a passageway of the exhaust gas and a plurality of nozzle vanes disposed between the pair of exhaust introduction walls and supported to be rotatable about the turbine impeller, and wherein each nozzle vane includes a high-pressure wall surface facing the scroll passageway, the bearing housing side of the high-pressure wall surface is provided to be closer to the turbine impeller than the turbine housing side thereof, and when the turbine impeller rotates, the nozzle vane moves toward the turbine housing.

13 Claims, 8 Drawing Sheets

(56) References Cited

FOREIGN PATENT DOCUMENTS

| | | | | |
|---|---|---|---|---|
| JP | 2007-146695 | 6/2007 | | |
| JP | 2008-184971 | 8/2008 | | |
| JP | 2008184971 A | * | 8/2008 | |
| JP | 2009-215990 | 9/2009 | | |
| WO | WO 2006/061588 | 6/2006 | | |
| WO | WO 2008/129274 | 10/2008 | | |
| WO | WO 2008129274 A2 | * | 10/2008 | ............ F01D 17/16 |

OTHER PUBLICATIONS

Supplementary Search Report dated Feb. 14, 2012 issued in corresponding European Patent Application No. 09824611.9 (6 pages).

Chinese Office Action and English translation dated Nov. 5, 2012 issued in corresponding Chinese Patent Application No. 200980143240.4.

Chinese Office Action and English translation dated Oct. 19, 2012 issued in corresponding Chinese Patent Application No. 200980143240.4.

International Search Report and Written Opinion mailed Dec. 8 2009 in corresponding PCT International Application No. PCT/JP2009/005888.

S. Rajoo et al., "Lean and Straight Nozzle Vanes in a Variable Geometry Turbine: A Steady and Pulsating Flow Investigation," Proceedings of ASME Turbo Expo 2008: Power for Land, Sea and Air, GT2008, pp. 1-13, Jun. 9-13, 2008, Berlin, Germany.

* cited by examiner

TURBOCHARGER

CROSS-REFERENCE TO RELATED APPLICATIONS

The present application is a 35 U.S.C. §§371 national phase conversion of PCT/JP2009/005888, filed Nov. 5, 2009, which claims priority of Japanese Patent Application No. 2008-284140, filed Nov. 5, 2008, the contents of which are incorporated herein by reference. The PCT International Application was published in the Japanese language.

TECHNICAL FIELD

The present invention relates to a turbocharger.
Priority is claimed on Japanese Patent Application No. 2008-284140, filed Nov. 5, 2008, the content of which is incorporated herein by reference.

BACKGROUND ART

A variable capacity type turbocharger is known including a bearing housing rotatably supporting a turbine impeller, a turbine housing having a scroll passageway supplying an exhaust gas to the turbine impeller, and an exhaust nozzle changing the stream angle and the flow rate of the exhaust gas supplied from the scroll passageway to the turbine impeller (for example, refer to Japanese Unexamined Patent Application, First Publication No. 11-229815).

The exhaust nozzle of the variable capacity type turbocharger of Japanese Unexamined Patent Application, First Publication No. 11-229815 includes a movable nozzle blade (nozzle vane) located between a pair of parallel walls (exhaust introduction walls) which is located between a bladed wheel (turbine impeller) and a scroll chamber (scroll passageway). Then, both end portions of the nozzle vane facing the exhaust introduction wall are formed to be thicker than the center portion, and the end surfaces of both end portions are formed to be parallel to the exhaust introduction wall.

Accordingly, the length in the thickness direction of both end surfaces of the nozzle vane facing the exhaust introduction wall can be large, a sufficient seal length is obtained, and a gap stream can be prevented. Since the gap stream is prevented, a degradation of turbine efficiency can be prevented.

SUMMARY OF INVENTION

Technical Problem

However, in the turbocharger in Japanese Unexamined Patent Application, First Publication No. 11-229815, a problem arises in that the position of the nozzle vane in the axial direction of the turbine impeller can not be controlled with respect to the pair of exhaust introduction walls due to pressure applied from the exhaust gas to the nozzle vane.

In Japanese Unexamined Patent Application, First Publication No. 11-229815, when the nozzle vane does not move toward any one of the exhaust introduction walls, a sealing performance between the nozzle vane and both exhaust introduction walls can be improved. Accordingly, an excellent effect can be demonstrated in that a degradation of turbine efficiency can be prevented.

However, there is a case in which the nozzle vane moves closer to a bearing housing side of the exhaust introduction wall so that a gap between the nozzle vane and a turbine housing side of the exhaust introduction wall becomes larger. The loss generated when the exhaust gas passing through the turbine housing side of the gap flows into the turbine impeller is relatively larger than the loss generated when the exhaust gas passing through the bearing housing side of the gap flows into the turbine impeller. In the former case, the turbine efficiency degrades more than the latter case.

Further, in Japanese Unexamined Patent Application, First Publication No. 11-229815, the nozzle vane is curved in an R-shape, and both end portions are formed so as to be thick. Then, when the nozzle vane is formed in a convex shape toward a low-pressure side, the difference in pressure between a low pressure and a high pressure decreases, and the stream in a gap between the nozzle vane and the exhaust introduction wall based on the difference in pressure can be reduced.

However, even when the nozzle vane is formed in a convex shape in this manner, there is a case in which the nozzle vane is disposed at a position relatively close to the bearing housing side of the exhaust introduction wall and a gap between the nozzle vane and the turbine housing side of the exhaust introduction wall becomes larger. In this case, as described above, the loss generated when the exhaust gas having passed through the turbine housing side of the gap flows into the turbine impeller is relatively larger than the loss generated when the exhaust gas passing through the turbine housing side of the gap flows into the turbine impeller. In the former case, the turbine efficiency is degraded more than the latter case. Accordingly, the turbine efficiency is degraded.

Therefore, the invention provides a turbocharger capable of controlling the movement direction of a nozzle vane and improving turbine efficiency.

Solution to Problem

In order to solve the above-described problems, there is provided a variable capacity type turbocharger including: a bearing housing which rotatably supports a turbine impeller; a turbine housing which has a scroll passageway formed therein to supply an exhaust gas to the turbine impeller; and an exhaust nozzle which changes a flow rate and a stream angle of the exhaust gas supplied from the scroll passageway to the turbine impeller, wherein the exhaust nozzle includes a pair of exhaust introduction walls forming a passageway of the exhaust gas and a plurality of nozzle vanes disposed between the pair of exhaust introduction walls and supported to be rotatable about the turbine impeller, and wherein each nozzle vane includes a high-pressure wall surface facing the scroll passageway, the bearing housing side of the high-pressure wall surface is provided to be closer to the turbine impeller than the turbine housing side thereof, and when the turbine impeller rotates, the nozzle vane moves toward the turbine housing or is pressed toward the turbine housing side of the exhaust introduction wall so as to narrow a gap between the nozzle vane and the turbine housing side of the exhaust introduction wall among the pair of exhaust introduction walls.

Further, in the turbocharger of one embodiment of the present invention, (a thrust for moving the nozzle vane toward the turbine housing)/(a pressure surface projection area of the nozzle vane) may be 0.02 to 0.05 [N/mm$^2$].

Further, in the turbocharger of one embodiment of the present invention, a hub-shroud average value of a nozzle passageway length to width ratio L/Wth (L denotes a length of the nozzle passageway and Wth denotes a width of an outlet of the nozzle passageway) may be larger than 1.5.

Further, in the turbocharger of one embodiment of the present invention, a hub-shroud average value of a nozzle contraction ratio Win/Wth (Win denotes a width of an inlet of the nozzle passageway and Wth denotes a width of an outlet of the nozzle passageway) may be smaller than 1.95.

Further, in the turbocharger of one embodiment of the present invention, a stacking line of a rear edge of the nozzle vane may be parallel to the shaft of the turbine impeller.

Further, in the turbocharger of one embodiment of the present invention, an inclination angle of the nozzle vane at an end portion in the downstream of the exhaust gas with respect to the shaft may be different from an inclination angle of a front edge of the blade of the turbine impeller with respect to the shaft.

Further, in the turbocharger of one embodiment of the present invention, the exhaust nozzle may include a support shaft supporting the nozzle vane, at least one of the pair of exhaust introduction walls may be provided with a support hole rotatably supporting the support shaft, and the support shaft may be fixed to the nozzle vane through a flange portion protruding outward in the radial direction of the support shaft.

Further, in the turbocharger of one embodiment of the present invention, the high-pressure wall surface of the nozzle vane may be a curved surface.

Advantageous Effects of Invention

In the turbocharger of one embodiment of the present invention, the nozzle vane is provided so that the bearing housing side of the high-pressure wall surface of the nozzle vane is closer to the turbine impeller than the turbine housing side of the high-pressure wall surface thereof.

When the turbocharger is operated, an exhaust gas is supplied to the scroll passageway, and the exhaust gas passes through the gaps of the pair of the exhaust introduction walls of the exhaust nozzle by the rotation of the turbine impeller. At this time, the pressure of the exhaust gas acts on the high-pressure wall surface of the nozzle vane in the direction perpendicular to the high-pressure wall surface.

For this reason, a component force acts on the nozzle vane in the direction of moving the nozzle vane toward the turbine housing or pressing the nozzle vane against the turbine housing side of the exhaust introduction wall. Accordingly, the gap provided between the nozzle vane and the turbine housing side of the exhaust introduction wall becomes smaller, so that the turbine efficiency improves.

Accordingly, due to the turbocharger of one embodiment of the present invention, the movement direction of the nozzle vane can be controlled, and the turbine efficiency can be improved.

DESCRIPTION OF EMBODIMENTS

Hereinafter, an embodiment of the invention will be described by referring to the drawings.

A turbocharger of the present embodiment is a variable capacity type turbocharger capable of adjusting, for example, a flow rate and a stream angle of an exhaust gas supplied to a turbine impeller based on a variation in flow rate of the gas in response to a variation in an engine rotational speed. Furthermore, in the drawings below, the scales of the parts are appropriately changed so that the parts have sizes recognizable in the drawings.

Figure 1:
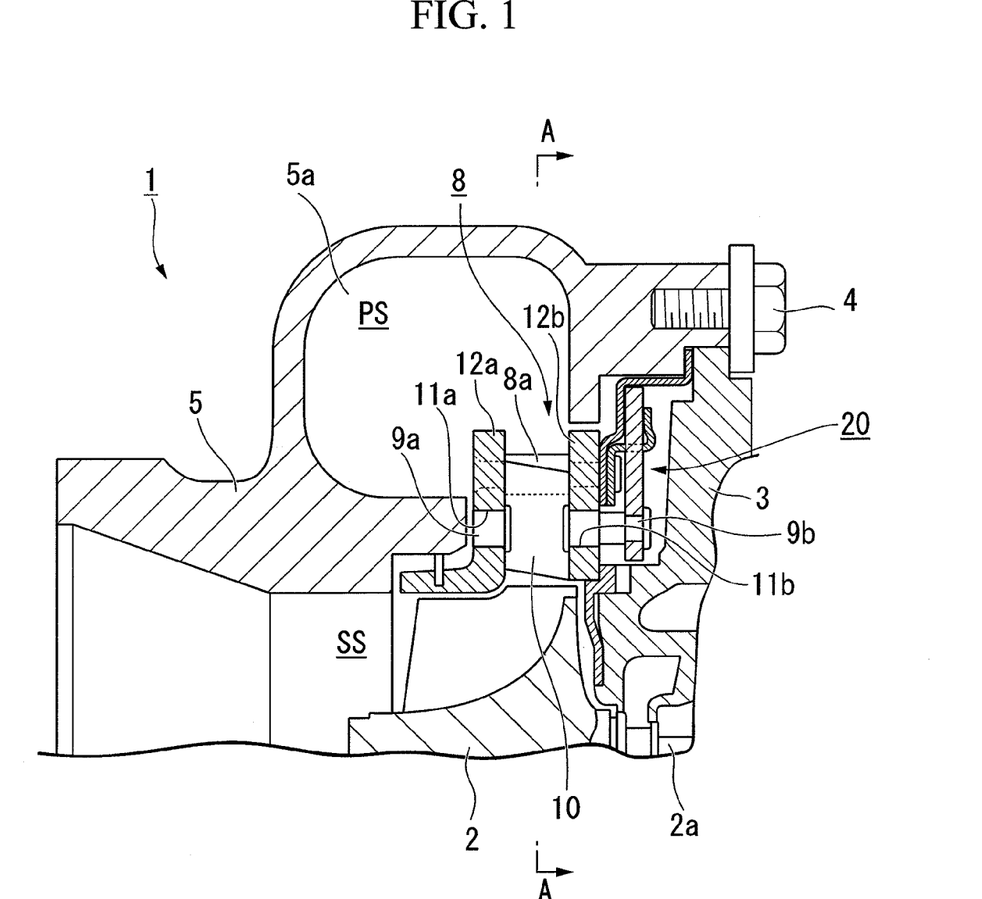
FIG. 1 is a partially enlarged cross-sectional view illustrating a turbocharger of an embodiment of the invention.

FIG. 1 is a partially enlarged cross-sectional view illustrating a turbocharger of an embodiment of the invention.

As shown in FIG. 1, a turbocharger 1 of the present embodiment includes a bearing housing 3 rotatably supporting a turbine impeller 2. A turbine housing 5 is integrally attached to one side (the upper side of the drawing) of the bearing housing 3 by bolts 4. Further, a compressor housing (not shown) is integrally attached to the opposite side (the lower side of the drawing) of the turbine housing 5 in the bearing housing 3 by bolts.

The turbine housing 5 includes a scroll passageway 5a which supplies an exhaust gas to the turbine impeller 2 and an exhaust nozzle 8 which adjusts a flow rate and a stream angle of the exhaust gas supplied from the scroll passageway 5a to the turbine impeller 2.

The scroll passageway 5a is provided with an exhaust gas introduction port (not shown) connected to, for example, an engine cylinder and the like.

The exhaust nozzle 8 includes a first exhaust introduction wall 12a and a second exhaust introduction wall 12b which are used to form a passageway of the exhaust gas.

The first exhaust introduction wall 12a is formed in an annular shape around the turbine impeller 2 and is disposed closer to the turbine housing 5.

In the same manner, the second exhaust introduction wall 12b is formed in an annular shape around the turbine impeller 2 and is disposed closer to the bearing housing 3 to face the first exhaust introduction wall 12a.

The first exhaust introduction wall 12a and the second exhaust introduction wall 12b are integrally connected to each other by a connection pin 8a.

Further, the exhaust nozzle 8 includes a plurality of nozzle vanes 10 disposed between the first exhaust introduction wall 12a and the second exhaust introduction wall 12b.

The nozzle vanes 10 are evenly arranged around the turbine impeller 2 and are rotatably supported by the support shafts 9a and 9b formed to be substantially parallel to the shaft 2a of the turbine impeller 2.

The support shafts 9a and 9b are respectively fixed to the end portion of the nozzle vane 10 facing the first exhaust introduction wall 12a and the end portion of the nozzle vane 10 facing the second exhaust introduction wall 12b, and are integrally formed with the nozzle vanes 10.

The first exhaust introduction wall 12a and the second exhaust introduction wall 12b are respectively provided with support holes 11a and 11b rotatably supporting the support shafts 9a and 9b.

The support shaft 9b is connected to a link mechanism 20 that transmits power of an actuator (not shown) to the support shaft 9b to be rotated.

Figure 2A:
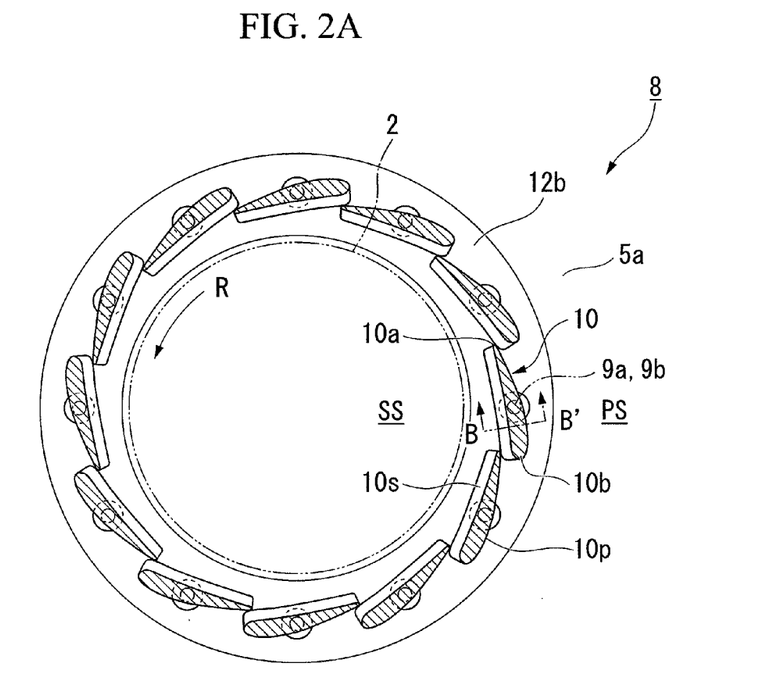
FIG. 2A is a cross-sectional view illustrating an exhaust nozzle when taken along the line A-A of FIG. 1.
Figure 2B:
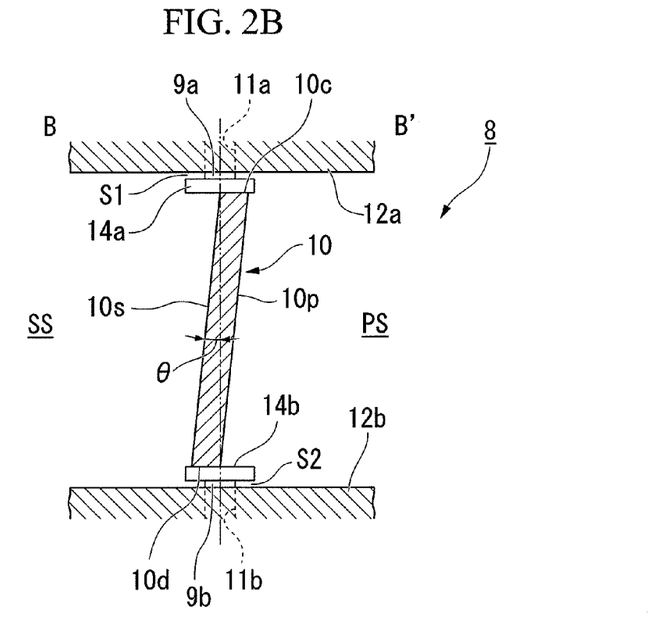
FIG. 2B is a cross-sectional view taken along the line B-B' of FIG. 2A.

FIG. 2A is a cross-sectional view illustrating the exhaust nozzle 8 when taken along the line A-A of FIG. 1. FIG. 2B is a cross-sectional view illustrating the vicinity of the nozzle vane 10 when taken along the line B-B' of FIG. 2A. Furthermore, in FIGS. 2A and 2B, the connection pin 8a is not shown.

As shown in FIG. 2A, each nozzle vane 10 is formed in a stream-lined airfoil of which the thickness of the rear edge 10a is thin and the thickness of the front edge 10b is thick in the plan view. The rear edge 10a of the nozzle vane 10 is provided at the downstream of the exhaust gas rather than the support shafts 9a and 9b, and the front edge 10b is provided at the upstream of the exhaust gas rather than the support shafts 9a and 9b. Then, the rear edge 10a is provided to be closer to the turbine impeller 2 than the front edge 10b. Further, the rear edge 10a is provided at the front side of the rotation direction R of the turbine impeller 2 rather than the front edge 10b.

As shown in FIG. 1, a scroll passageway side of FIG. 1 outside the exhaust nozzle 8 is a high pressure side PS of the exhaust gas, and a turbine impeller 2 side of FIG. 1 inside the exhaust nozzle 8 is a low pressure side SS of the exhaust gas.

For this reason, as shown in FIG. 2A, the opposite side from the turbine impeller 2 in the nozzle vane 10 is the high pressure side PS of the exhaust gas, and the turbine impeller 2 side of the nozzle vane 10 is the low pressure side SS of the exhaust gas.

The nozzle vane 10 includes a high-pressure wall surface 10p formed at the high pressure side PS facing the scroll passageway 5a and a low-pressure wall surface 10s formed at the low pressure side SS facing the turbine impeller 2.

As shown in FIG. 2B, the nozzle vane 10 is inclined by the inclination angle θ with respect to the support shafts 9a and 9b and the shaft 2a of the turbine impeller 2. Accordingly, the high-pressure wall surface 10p of the nozzle vane 10 is inclined with respect to the support shafts 9a and 9b and the shaft 2a of the turbine impeller 2. Then, the first exhaust introduction wall 12a side of the high-pressure wall surface 10p protrudes toward the high pressure side PS more than the second exhaust introduction wall 12b side of the high-pressure wall surface 10p.

That is, as shown in FIG. 1, the high-pressure wall surface 10p of the nozzle vane 10 is inclined with respect to the support shafts 9a and 9b and the shaft 2a of the turbine impeller 2 so that the bearing housing 3 side of the high-pressure wall surface 10p is closer to the turbine impeller 2 than the turbine housing 5 side of the high-pressure wall surface 10p.

As shown in FIG. 2B, the support shafts 9a and 9b include flange portions 14a and 14b which are provided in the end portions of the nozzle vane 10 so as to protrude outward in the radial direction of the support shafts 9a and 9b. The support shafts 9a and 9b are respectively fixed to the end portions 10c and 10d of the nozzle vane 10 respectively facing the first exhaust introduction wall 12a and the second exhaust introduction wall 12b through the flange portions 14a and 14b.

Figure 3A:
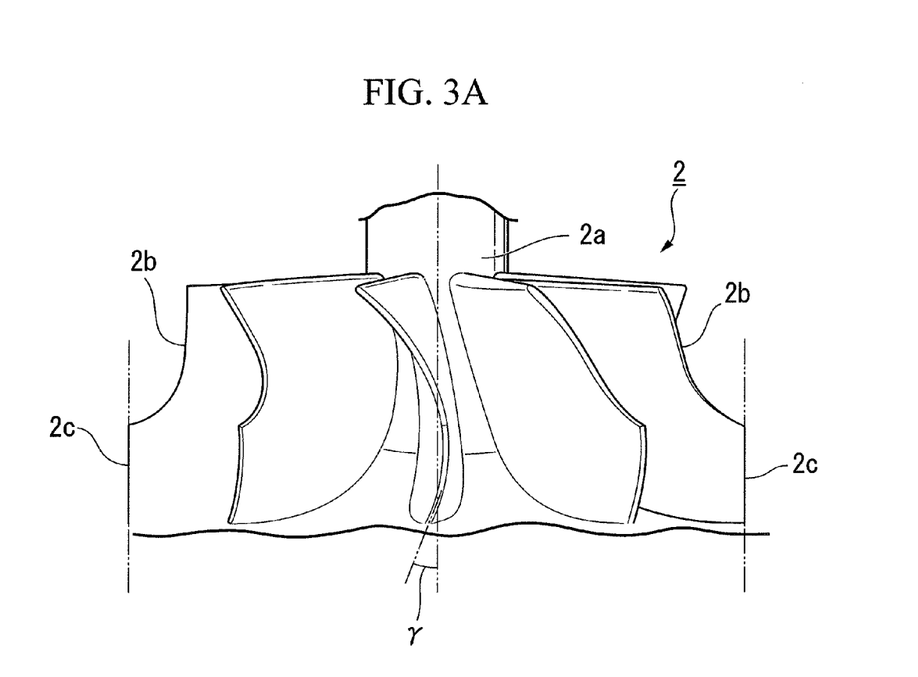
FIG. 3A is a perspective view illustrating a turbine impeller.
Figure 3B:
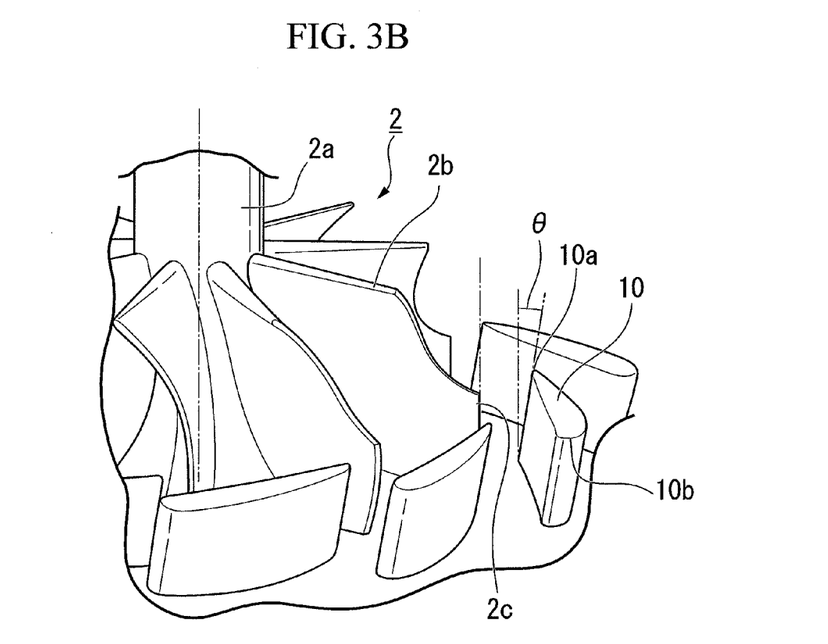
FIG. 3B is a perspective view illustrating the turbine impeller and a nozzle vane.

FIG. 3A is a perspective view illustrating the turbine impeller 2 of the turbocharger 1 of the present embodiment, and FIG. 3B is a perspective view illustrating the turbine impeller 2 and the nozzle vane 10. Furthermore, in FIG. 3B, the other portions are omitted in order to show a relationship between the turbine impeller 2 and the nozzle vane 10.

As shown in FIG. 3A, the turbine impeller 2 is provided with a plurality of blades 2b that receives a pressure of an exhaust gas to rotate the turbine impeller 2. The front edge 2c of the blade 2b is inclined with respect to the shaft 2a of the turbine impeller 2 by the inclination angle γ.

As shown in FIG. 3B, the rear edge 10a of the nozzle vane 10 is inclined with respect to the shaft 2a of the turbine impeller 2 by the inclination angle θ. That is, the inclination angle θ of the rear edge 10a at the downstream of the exhaust gas of the nozzle vane 10 with respect to the shaft 2a is different from the inclination angle γ of the front edge 2c of the blade 2b of the turbine impeller 2 with respect to the shaft 2a.

With the above-described configuration, the turbocharger 1 of the embodiment shown in FIG. 1 receives an exhaust gas discharged from, for example, an engine cylinder into the scroll passageway 5a of the turbine housing 5, and supplies the exhaust gas to the turbine impeller 2 through the exhaust nozzle 8. Accordingly, the blade 2b of the turbine impeller 2 receives the exhaust gas, so that the turbine impeller 2 rotates and the shaft 2a rotates the compressor impeller.

Air received from an air introduction port and compressed by the rotation of the compressor impeller passes through a diffuser passageway so that dynamic energy changes to static energy, and is supplied to a compressor scroll passageway. Then, the air for which the pressure is raised inside the compressor scroll passageway is supplied to, for example, an engine cylinder from an air discharge port.

Here, the turbocharger 1 of the present embodiment includes an exhaust nozzle 8 which adjusts a flow rate and a stream angle of an exhaust gas supplied to the turbine impeller 2 based on, for example, a variation in flow rate of the gas in response to a variation in an engine rotational speed. When the pressure of the exhaust gas is adjusted by the exhaust nozzle 8, the link mechanism 20 is first driven by a power source such as an actuator so as to rotate the support shaft 9b of the nozzle vane. Then, the nozzle vanes 10 rotate about each of the support shafts 9b in a synchronized manner.

At this time, the rotation angle of the nozzle vane 10 is adjusted to adjust an opening degree of the exhaust nozzle 8, whereby the flow rate and the stream angle of the exhaust gas supplied to the turbine impeller 2 can be adjusted.

The exhaust gas passing between the first exhaust introduction wall 12a and the second exhaust introduction wall 12b of the exhaust nozzle 8 flows along the blade 2b of the turbine impeller 2 while the flow rate and the stream angle are adjusted, so that the turbine impeller 2 is rotated in the rotation direction R shown in FIG. 2A.

Next, an operation of the present embodiment will be described.

As shown in FIGS. 1, 2A, and 2B, the turbocharger 1 of the present embodiment has a structure in which the high-pressure wall surface 10p of the nozzle vane 10 provided at the high pressure side PS of the exhaust gas is inclined with respect to the shaft 2a of the turbine impeller 2 by the inclination angle θ. The second exhaust introduction wall 12b side (the bearing housing 3 side) of the high pressure wall surface 10p is inclined to be closer to the turbine impeller 2 more than the first exhaust introduction wall 12a side (the turbine housing 5 side) of the high-pressure wall surface 10p.

The pressure P of the exhaust gas flowing from the scroll passageway 5a into the passageway between the first exhaust introduction wall 12a and the second exhaust introduction wall 12b of the exhaust nozzle 8 acts on the inclined high-pressure wall surface 10p in the perpendicular direction. On the other hand, the pressure P' of the exhaust gas also acts on the low-pressure wall surface 10s of the nozzle vane 10 in the perpendicular direction. At this time, a relationship of P>P' is established.

Therefore, the resultant force of the above two forces acts to the nozzle vane 10 such that a component force (P-P') cos θ acts from the high pressure side PS to the low pressure side SS in the direction perpendicular to the support shafts 9a and 9b, and a component force (P-P') sin θ acts toward the first exhaust introduction wall 12a in the direction parallel to the support shafts 9a and 9b.

The movement of the nozzle vane 10 in the direction perpendicular to the support shafts 9a and 9b is regulated by the support holes 11a and 11b rotatably supporting the support shafts 9a and 9b. However, as shown in FIG. 2B, a gap S1 is provided between the nozzle vane 10 and the first exhaust introduction wall 12a, and a gap S2 is provided between the nozzle vane 10 and the second exhaust introduction wall 12b. For this reason, the nozzle vane 10 is provided to be freely movable within the range of the gaps S1 and S2 in the direction parallel to the support shafts 9a and 9b.

Accordingly, even when the pressure P and P' of the exhaust gas acts on the nozzle vane 10 so that a component force (P-P') cos θ acts on the nozzle vane 10 in the direction perpendicular to the support shafts 9a and 9b, the nozzle vane 10 hardly moves in the direction perpendicular to the support shafts 9a and 9b.

However, when the pressure P and P' of the exhaust gas acts on the nozzle vane 10 so that a component force (P-P') sin θ acts on the nozzle vane 10 in the direction parallel to the support shafts 9a and 9b, the nozzle vane 10 moves toward the first exhaust introduction wall 12a to be parallel to the support shafts 9a and 9b.

Furthermore, in accordance with the position of the nozzle vane before the turbine impeller rotates, there is a case in which the gap S1 is zero and only the gap S2 is present. In this case, the nozzle vane 10 presses the exhaust introduction wall 12a in the direction parallel to the support shafts 9a and 9b by a component force (P-P') sin θ acting to the nozzle vane in the direction parallel to the support shafts 9a and 9b.

When the nozzle vane 10 moves toward the first exhaust introduction wall 12a, the gap S1 between the first exhaust introduction wall 12a side end surface of the nozzle vane and the first exhaust introduction wall 12a becomes smaller. When the gap S1 becomes smaller, the resistance with respect to the exhaust gas passing through the gap S1 increases. When the resistance with respect to the exhaust gas passing through the gap S1 increases, the flow rate of the exhaust gas passing through the gap S1 decreases. When the flow rate of the exhaust gas passing through the gap S1 decreases, the total sum of the flow rate of the exhaust gas passing between the low-pressure wall surface 10s and the high-pressure wall surface 10p of the adjacent nozzle vanes 10 and the flow rate of the exhaust gas passing through the gap S2 relatively increases.

Here, as shown in FIGS. 1, 2A, and 2B, the exhaust gas supplied from the scroll passageway 5a (which is on the high pressure side PS of the exhaust gas) to the turbine impeller 2 (which is on the low pressure side SS of the exhaust gas) passes through a gap between the high-pressure wall surface 10p and the low-pressure wall surface 10s of the adjacent nozzle vanes 10 of the exhaust nozzle 8 (the nozzle passageway 32 to be described later). At this time, the flow rate and the stream angle are adjusted in accordance with the opening degree of the exhaust nozzle 8, and the turbine impeller 2 is rotated in the rotation direction R.

However, the exhaust gas passing through the gaps S1 and S2 respectively formed between the nozzle vane 10 and the first exhaust introduction wall 12a and between the nozzle vane 10 and the second exhaust introduction wall 12b contribute to the rotation of the turbine impeller 2 less than the exhaust gas passing through a gap between the high-pressure wall surface 10p and the low-pressure wall surface 10s of the nozzle vane 10 (the nozzle passageway 32 to be described later). Here, when the nozzle vane 10 moves toward the first exhaust introduction wall 12a by a component force (P-P') sin θ parallel to the support shafts 9a and 9b, the gap S1 becomes smaller, but the gap S2 becomes larger, whereby the efficiency of rotating the turbine impeller 2 considerably degrades.

However, an improved efficiency of rotating the turbine impeller 2 with a decrease in flow passing through the gap S1 decreased in size when the nozzle vane 10 moves toward the first exhaust introduction wall is greater than a reduced efficiency of rotating the turbine impeller 2 with the flow passing through the gap S2 increased in size when the nozzle vane 10 moves toward the first exhaust introduction wall. Accordingly, as a result, when the nozzle vane 10 moves toward the first exhaust introduction wall, the turbine efficiency of the turbocharger 1 can be improved.

Further, as shown in FIGS. 3A and 3B, in the turbocharger 1 of the present embodiment, the inclination angle θ of the end edge of the rear edge 10a at the downstream of the exhaust gas of the nozzle vane 10 is different from the inclination angle γ of the front edge 2c of the blade 2b of the turbine impeller 2 with respect to the shaft 2a.

When the inclination angle θ of the end edge of the rear edge 10a of the nozzle vane 10 is equal to the inclination angle γ of the front edge 2c of the blade 2b of the turbine impeller 2 with respect to the shaft 2a in accordance with a design specification, the rear stream generated at the downstream of the nozzle vane 10 simultaneously flows into the front edge 2c of the blade 2b of the turbine impeller 2. Then, an exciting force toward the turbine impeller 2 becomes larger, and the turbine impeller 2, the turbine housing 5, or the like may be damaged due to the sympathetic vibration. For this reason, conventionally, in the background art, there was a need to incline the front edge 2c of the blade 2b of the turbine impeller 2 with respect to the shaft 2a of the turbine impeller 2.

However, in the turbocharger 1 of the present embodiment, the nozzle vane 10 is inclined with respect to the shaft of the turbine impeller 2. For this reason, the inclination angle γ of the front edge 2c and the inclination angle θ of the end edge of the rear edge 10a of the nozzle vane 10 can be set to be different without inclining the front edge 2c of the blade 2b of the turbine impeller 2. Likewise, when the inclination angle γ and the inclination angle θ are different from each other, the inclination angle θ and the inclination angle γ can be set to arbitrary angles.

According to the turbocharger 1 of the present embodiment, since the inclination angle γ of the turbine impeller 2 with respect to the shaft 2a of the front edge 2c is different from the inclination angle θ of the nozzle vane 10, the exciting force toward the turbine impeller 2 is reduced and the damage caused by the sympathetic vibration can be prevented. Further, since the inclination angle θ of the nozzle vane 10 can be changed, the degree in freedom of design of the inclination angle γ of the turbine impeller 2 with respect to the shaft 2*a* of the front edge 2*c* increases.

Further, as shown in FIG. 2B, in the turbocharger 1 of the present embodiment, the exhaust nozzle 8 includes the support shafts 9*a* and 9*b* supporting the nozzle vane 10. Then, the first and second exhaust introduction walls 12*a* and 12*b* facing each other are respectively provided with the support holes 11*a* and 11*b* and rotatably support the support shafts 9*a* and 9*b*. Further, the support shafts 9*b* and 9*b* are fixed to the nozzle vane 10 through the flange portions 14*a* and 14*b* protruding outward in the radial direction of the support shafts 9*a* and 9*b*.

For this reason, even when the nozzle vane 10 is inclined with respect to the support shafts 9*a* and 9*b*, the support shafts 9*a* and 9*b* can be respectively fixed to the end portions 10*c* and 10*d* of the nozzle vane 10. Then, since both end portions 10*c* and 10*d* of the nozzle vane 10 are supported by rotatably supporting the support shafts 9*a* and 9*b* using the support holes 11*a* and 11*b*, the nozzle vane 10 can be prevented from being oscillated. Accordingly, the nozzle vane 10 can be prevented from being cut in or fixed to the first exhaust introduction wall 12*a* or the second exhaust introduction wall 12*b*.

As described above, according to the turbocharger 1 of the present embodiment, the movement direction of the nozzle vane 10 can be controlled to the direction of the first exhaust introduction wall 12*a*. Furthermore, the gap S1 between the nozzle vane 10 and the first exhaust introduction wall 12*a* can be made to be relatively smaller than the gap S2 between the nozzle vane 10 and the second exhaust introduction wall 12*b*, thereby improving the turbine efficiency.

Next, modified examples of the turbocharger 1 of the present embodiment will be described by incorporating FIGS. 1 to 3B and using FIGS. 4A to 4D. The modified examples below are different from the turbocharger 1 of the above-described embodiment in that the shape of the nozzle vane 10 or the connection method to the support shafts 9*a* and 9*b* are different. Since the other configurations are the same as those of the above-described embodiment, the description thereof will be omitted by giving the same reference numerals to the same components.

(First Modified Example)

Figure 4A:
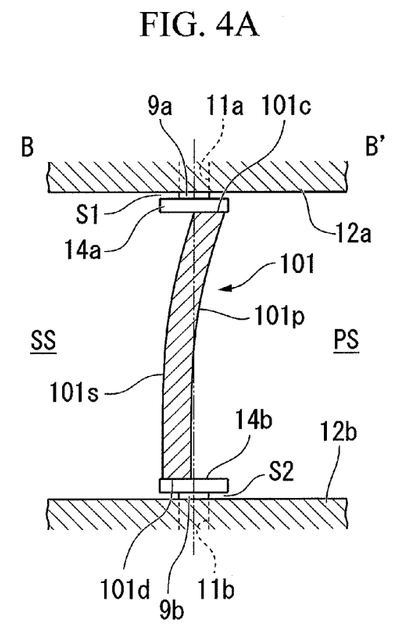
FIG. 4A is a cross-sectional view illustrating a modified example of the embodiment of the invention and corresponding to FIG. 2B.

FIG. 4A is a cross-sectional view illustrating a first modified example of the turbocharger 1 of the above-described embodiment and corresponding to FIG. 2B.

As shown in FIG. 4A, in the modified example, a high-pressure wall surface 101*p* and a low-pressure wall surface 101*s* of a nozzle vane 101 are formed as a curved surface. As the high-pressure wall surface 101*p* becomes closer to the first exhaust introduction wall 12*a*, the inclination angle with respect to the support shafts 9*a* and 9*b* becomes larger, and the high-pressure wall surface 101*p* is inclined to be distant from the turbine impeller 2. Furthermore, in an analogous manner to FIG. 2B, the support shafts 9*a* and 9*b* are respectively fixed to end portions 101*c* and 101*d* of the nozzle vane 101 respectively facing the first exhaust introduction wall 12*a* and the second exhaust introduction wall 12*b* through the flange portions 14*a* and 14*b*.

According to this configuration, the same effect as that of the above-described embodiment can be obtained, and the magnitude of a component force in the direction parallel to the support shafts 9*a* and 9*b* of the pressure P acting on the nozzle vane 101 can be adjusted by the shape of the curved surface of the high-pressure wall surface 101*p*.

(Second Modified Example)

Figure 4B:
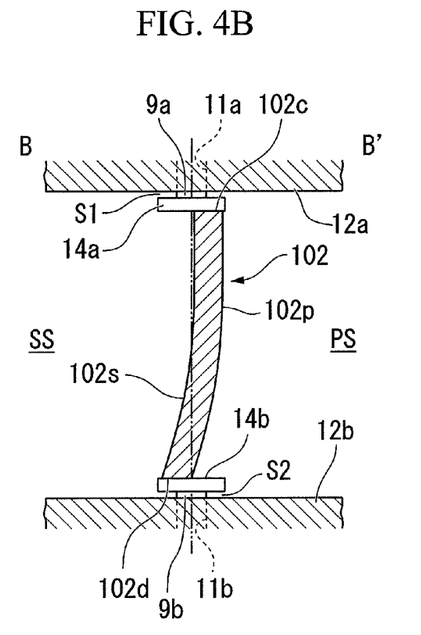
FIG. 4B is a cross-sectional view illustrating a modified example of the embodiment of the invention and corresponding to FIG. 2B.

FIG. 4B is a cross-sectional view illustrating a second modified example of the turbocharger 1 of the above-described embodiment and corresponding to FIG. 2B.

As shown in FIG. 4B, in the modified example, as in the first modified example, a high-pressure wall surface 102*p* and a low-pressure wall surface 102*s* of a nozzle vane 102 are formed as a curved surface. As the high-pressure wall surface 102*p* becomes closer to the second exhaust introduction wall 12*b*, the inclination angle with respect to the support shafts 9*a* and 9*b* becomes larger, and the high-pressure wall surface 102*p* is inclined to be close to the turbine impeller 2. Furthermore, in an analogous manner to FIG. 2B, the support shafts 9*a* and 9*b* are respectively fixed to end portions 102*c* and 102*d* of the nozzle vane 102 respectively facing the first exhaust introduction wall 12*a* and the second exhaust introduction wall 12*b* through the flange portions 14*a* and 14*b*.

According to this configuration, the same effect as that of the above-described embodiment can be obtained, and the magnitude of a component force in the direction parallel to the support shafts 9*a* and 9*b* of the pressure P applied to the nozzle vane 102 can be adjusted by the shape of the curved surface of the high-pressure wall surface 102*p*.

(Third Modified Example)

Figure 4C:
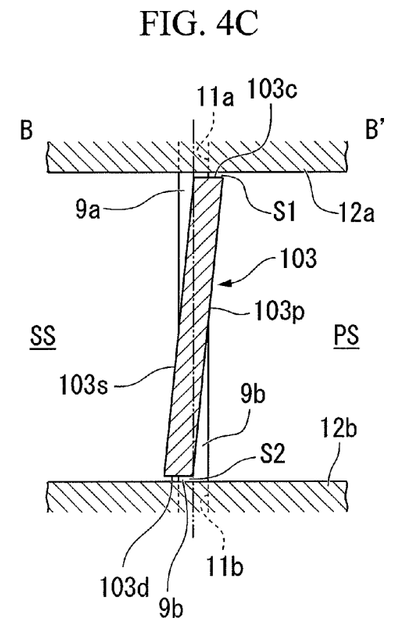
FIG. 4C is a cross-sectional view illustrating a modified example of the embodiment of the invention and corresponding to FIG. 2B.

FIG. 4C is a cross-sectional view illustrating a third modified example of the turbocharger 1 of the above-described embodiment and corresponding to FIG. 2B.

As shown in FIG. 4C, in the modified example, the flange portions 14*a* and 14*b* are not provided, and a high-pressure wall surface 103*p* and a low-pressure wall surface 103*s* of a nozzle vane 103 are directly fixed to the support shafts 9*a* and 9*b* through end portions 103*c* and 103*d* of the nozzle vane 103 facing the first exhaust introduction wall 12*a* and the second exhaust introduction wall 12*b* respectively, without intervening flange portions 14*a* and 14*b*, which are present in FIG. 2B.

According to this configuration, even when the flange portions 14*a* and 14*b* are not provided, the nozzle vane 103 can be moved toward the first exhaust introduction wall 12*a* as in the above-described embodiment. Then, the exhaust gas passing through the gap S1 can be reduced, and the turbine efficiency can be improved.

(Fourth Modified Example)

Figure 4D:
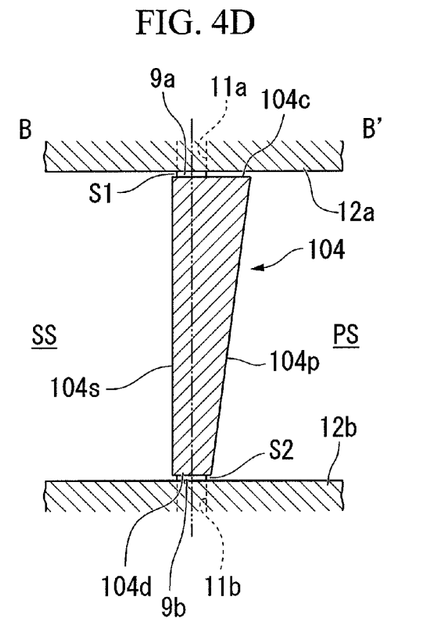
FIG. 4D is a cross-sectional view illustrating a modified example of the embodiment of the invention and corresponding to FIG. 2B.

FIG. 4D is a cross-sectional view illustrating a fourth modified example of the turbocharger 1 of the above-described embodiment and corresponding to FIG. 2B.

As shown in FIG. 4D, in the modified example, the flange portions 14*a* and 14*b* are not provided, and only a high-pressure wall surface 104*p* of a nozzle vane 104 is provided to be inclined. A low-pressure wall surface 104*s* of the nozzle vane 104 is provided to be substantially parallel to the support shafts 9*a* and 9*b*. Furthermore, the support shafts 9*a* and 9*b* are fixed to end portions 104*c* and 104*d* of the nozzle vane 104, respectively, facing the first exhaust introduction wall 12*a* and the second exhaust introduction wall 12*b* respectively.

According to this configuration, the nozzle vane 104 can be moved toward the first exhaust introduction wall 12*a* as in the above-described embodiment. Then, the exhaust gas passing through the gap S1 can be reduced, and the turbine efficiency can be improved.

Furthermore, the invention is not limited to the above-described embodiment and the modified examples thereof, but may be modified into various forms without departing from the concept of the invention. For example, the support shaft is provided only at the end portion facing the second exhaust introduction wall of the nozzle vane, and the nozzle vane may be supported in a cantilever shape. Further, when the link mechanism is provided at the turbine housing side of the exhaust nozzle, the support shaft may be provided only at the end portion facing the first exhaust introduction wall of the nozzle vane, and the nozzle vane may be supported in a cantilever shape.

Furthermore, the invention can be applied to the following modified example.

Figure 5:
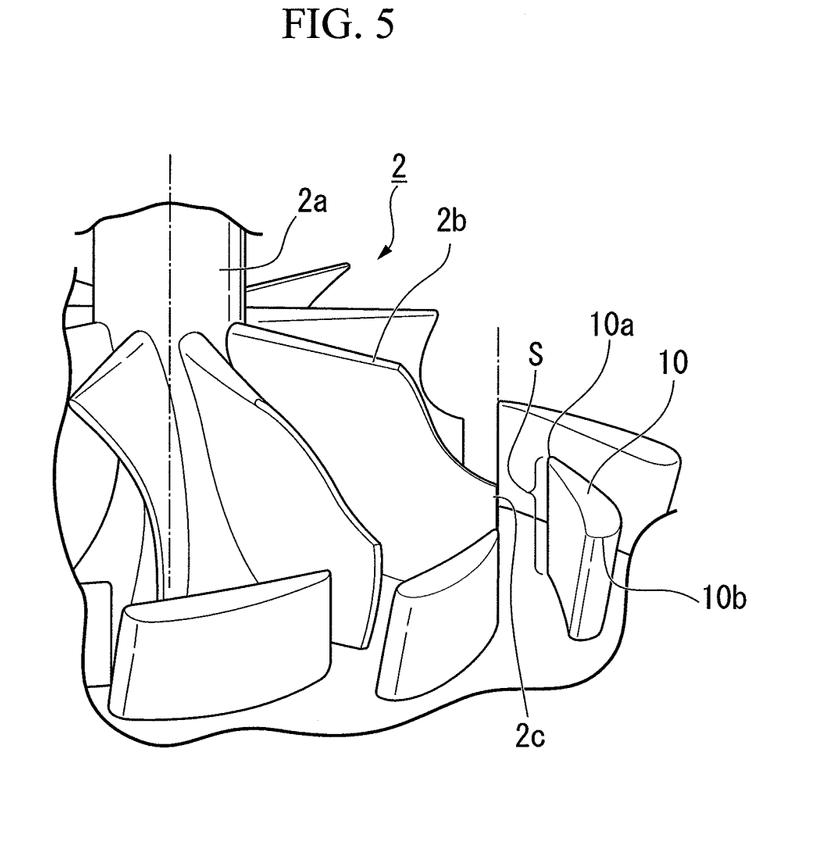
FIG. 5 is a perspective view illustrating the turbine impeller and the nozzle vane of a modified example of the invention.

The line formed by the rear edge 10a of the nozzle vane 10 shown in FIGS. 2A and 3B is referred to as a rear edge stacking line S. At this time, as shown in FIG. 5, the rear edge stacking line S of the nozzle vane 105 may be parallel to the shaft 2a of the turbine impeller (the inclination angle θ of the rear edge at the downstream of the exhaust gas of the nozzle vane of FIG. 3B with respect to the shaft may be zero). This is set as condition 1.

Figure 7:
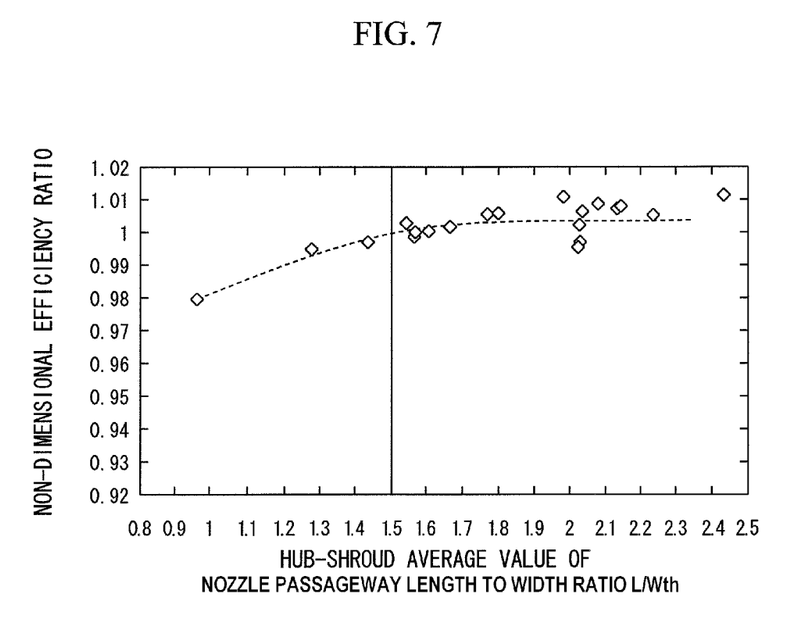
FIG. 7 is a graph illustrating a result obtained by a series of investigations of the invention.
Figure 8:
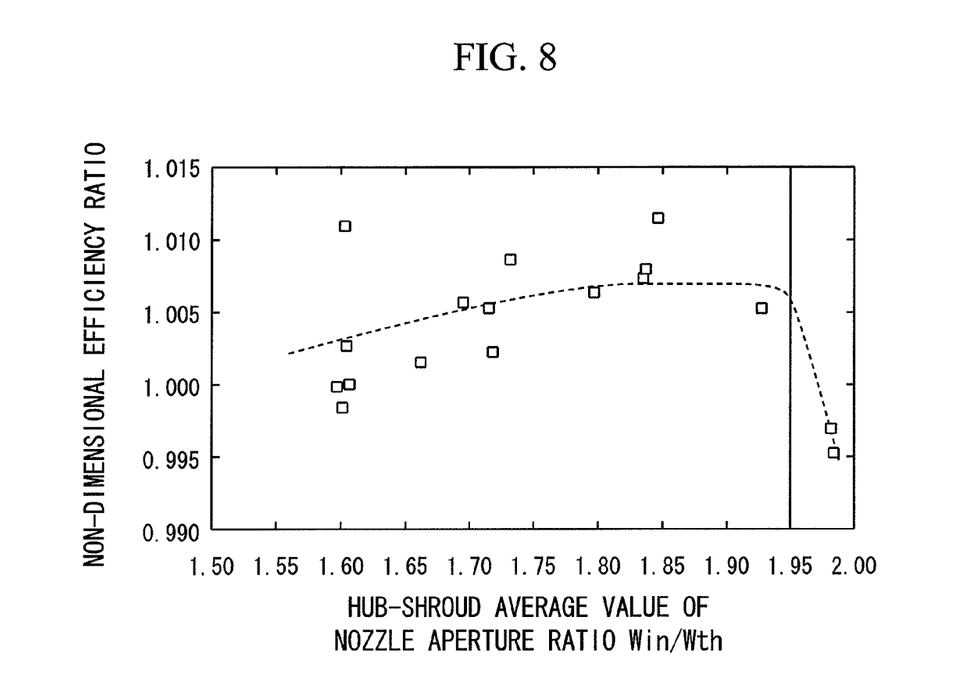
FIG. 8 is a graph illustrating a result obtained by a series of investigations of the invention.

Further, the use conditions of the above-described embodiment of the invention and the modified examples thereof were simulated by a CFD analysis, and the following results were obtained as an examination result thereof.

axis as in FIG. 7. By using the graph having the horizontal axis and the horizontal axis, the non-dimensional efficiency with respect to the hub-shroud average value of the nozzle aperture ratio Win/Wth is obtained, and as a result of this, the curve shown in FIG. 8 is obtained. From this curve, when the hub-shroud average value of the nozzle contraction ratio Win/Wth is smaller than 1.95, the non-dimensional efficiency exceeds 1, which is understood that the appropriate result is obtained. As described above, the hub-shroud average value of the nozzle contraction ratio Win/Wth may be smaller than 1.95. This is set as condition 3.

As shown in Table 1, four samples A, B, C, and D were prepared such that three samples do not satisfy one of the first to third conditions and one sample satisfies all conditions. For example, the sample A does not satisfy the first condition, but satisfies the second and third conditions. Furthermore, in columns of Table 1 corresponding to condition 1 to condition 3, O indicates that the sample satisfies the condition, and X indicates that the sample does not satisfy the condition.

TABLE 1

| SAMPLE | CONDITION 1 | CONDITION 2 | CONDITION 3 | SYMBOLS IN GRAPH | PERFORMANCE | EVALUATION |
|---|---|---|---|---|---|---|
| A | X | O | O | X | GOOD | FOURTH BEST |
| B | O | X | O | □ | GOOD | THIRD BEST |
| C | O | O | X | Δ | GOOD | SECOND BEST |
| D | O | O | O | O | EXCELLENT | FIRST BEST |

Figure 6:
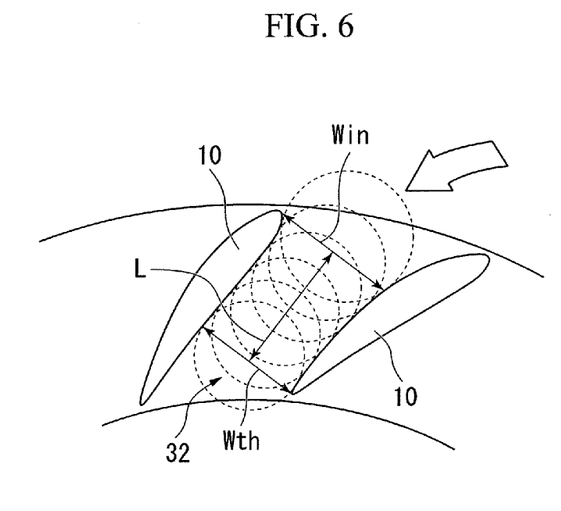
FIG. 6 is a diagram illustrating a part of a cross-section in which the nozzle vane shown in FIG. 2A is cut in a plane perpendicular to a shaft 2a of the turbine impeller.

FIG. 6 is a diagram showing a part of a cross-section in which the nozzle vane shown in FIG. 2A is cut in a plane perpendicular to the shaft 2a of the turbine impeller. In FIG. 6, the nozzle passageway length to width ratio L/Wth as a non-dimensional quantity obtained by dividing L (the length of the nozzle passageway 32) by Wth (the width of the outlet of the nozzle passageway 32) is obtained for each of the end surface of the hub side (the second exhaust introduction wall 12b side) of the nozzle vane and the end surface of the shroud side (the first exhaust introduction wall 12a side) of the nozzle vane, and was averaged as the hub-shroud average value of the nozzle passageway length to width ratio L/Wth. The hub-shroud average value is set as the horizontal axis. The non-dimensional efficiency of the turbocharger having the nozzle vane of the present embodiment of the invention was set as the vertical axis. By using the graph having the horizontal axis and the vertical axis, the non-dimensional efficiency for the hub-shroud average value of the nozzle passageway length to width ratio L/Wth is obtained, and as a result of this, the curve shown in FIG. 7 is obtained. From this curve, when the hub-shroud average value of the nozzle passageway length ratio L/Wth is larger than 1.5, the non-dimensional efficiency exceeds 1, which is understood that the appropriate result is obtained. As described above, the hub-shroud average value of the nozzle passageway length to width ratio L/Wth may be larger than 1.5. This is set as condition 2.

Figure 9:
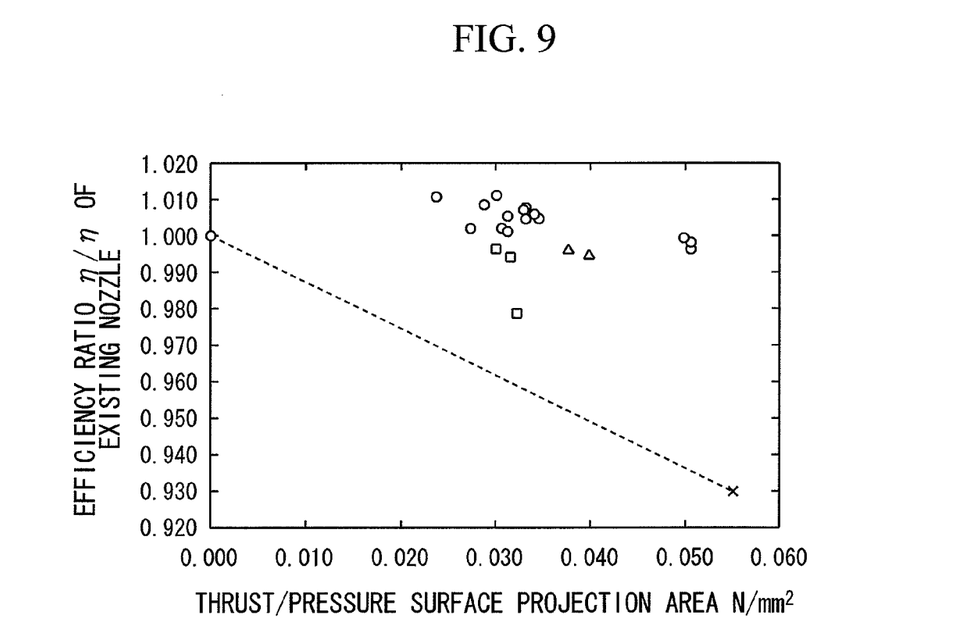
FIG. 9 is a graph illustrating a result obtained by a series of investigations of the invention.

FIG. 8 is a graph, where the nozzle contraction ratio Win/Wth obtained by dividing the width Win of the inlet of the nozzle passageway of the nozzle passageway 32 of FIG. 6 by the width Wth of the outlet of the nozzle passageway is obtained for each of the end surface at the hub side (the second exhaust introduction wall 12b side) of the nozzle vane and the end surface at the shroud side (the first exhaust introduction wall 12a side) of the nozzle vane, and is averaged as the hub-shroud average value of the nozzle contraction ratio Win/Wth. The hub-shroud average value is set as the horizontal axis, and the non-dimensional efficiency is set as the vertical The turbine efficiency is obtained by using the samples through a CFD analysis, and is plotted on the following graph. That is, a thrust/pressure surface projection area [N/mm$^2$] obtained by dividing a thrust for moving the nozzle vane according to the embodiment of the present invention toward the first exhaust introduction wall 12a by the pressure surface projection area of the nozzle vane is set as the horizontal axis. Further, the efficiency ratio η/ηc obtained by dividing the turbine efficiency (η) of the turbocharger including the nozzle vane according to the embodiment of the present invention by the turbine efficiency (ηc) of the turbocharger using the existing nozzle is set as the vertical axis. In this way, the graph was prepared in FIG. 9. By using the graph having the horizontal axis and the vertical axis, the efficiency ratio with respect to the thrust/pressure surface projection area is obtained, and as a result of this, the result shown in FIG. 9 is obtained. From this, when the thrust/pressure surface projection area is 0.02 to 0.05 [N/mm$^2$] by using the sample D satisfying all of the above-described conditions, it is understood that the most appropriate result is obtained. As described above, the thrust/pressure surface projection area may be 0.02 to 0.05 [N/mm$^2$]. Furthermore, according to the graph, the case of the sample C is the second best, the case of the sample B is the third best, and the case of the sample A is the worst. Furthermore, when the thrust/pressure surface projection area is smaller than 0.02 [N/mm$^2$], it is not desirable in that the thrust for moving the nozzle vane toward the first exhaust introduction wall 12a can not move the nozzle vane against a frictional force acting on the nozzle vane. Further, when the thrust/pressure surface projection area is larger than 0.05 [N/mm$^2$], that is, the inclination of the nozzle vane with respect to the shaft of the turbine impeller is too large, an energy loss of a working fluid (air) increases due to the too large inclination of the nozzle vane, and as a result, the turbine efficiency of the turbocharger degrades. For this reason, this is not desirable. Here, the dotted line of FIG. 9 indicates that the upper area of the dotted line exhibits a satisfactory performance. Furthermore, the CFD analysis is performed such that the nozzle vane is disposed at the center of the passageway (the exhaust nozzle 8) and the gap S1 between the nozzle vane and the first exhaust introduction wall 12a is equal to the gap S2 between the nozzle vane and the second exhaust introduction wall 12b.

Furthermore, the invention may be applied to the following modified example.

Figure 10:
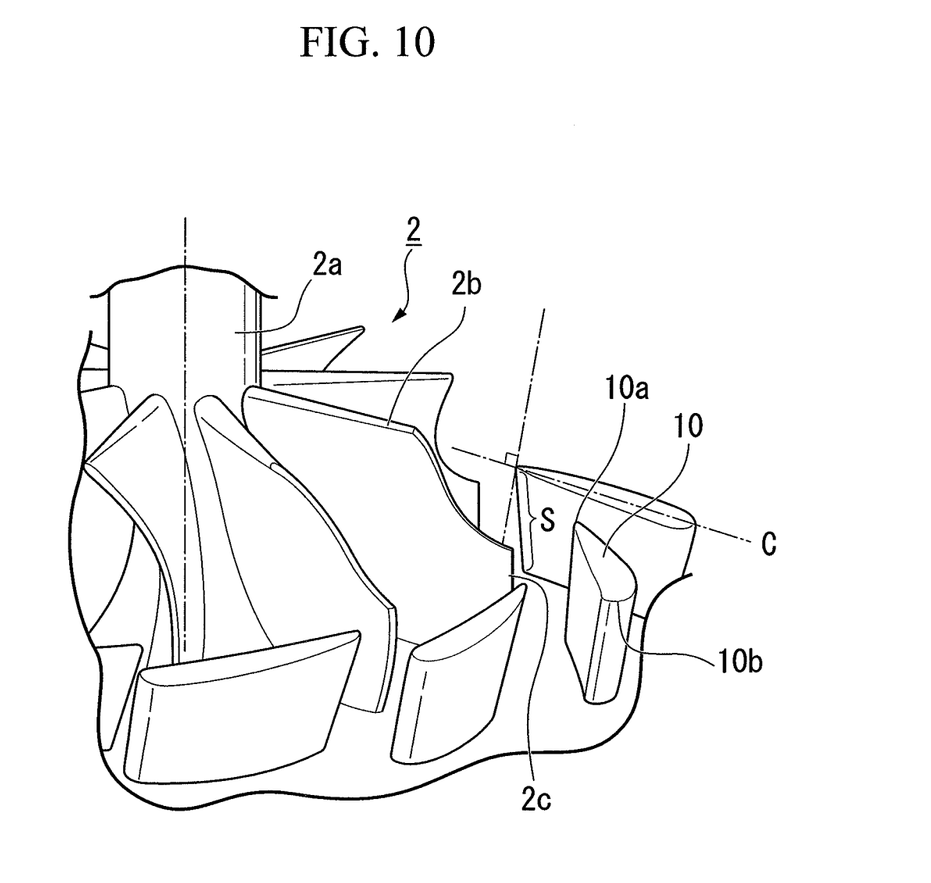
FIG. 10 is a perspective view illustrating the turbine impeller and the nozzle vane of the modified example of the invention.

As shown in FIG. 10, the rear stacking line S or the front edge of the nozzle vane 10 may not be perpendicular to the chord direction of the nozzle vane. Furthermore, FIG. 10 illustrates a case where the rear edge stacking line S of the nozzle vane 10 is not perpendicular to the chord direction of the nozzle vane (one-dotted chain line of FIG. 10).

That is, in the modified example, the rear edge stacking line S or the front edge of the nozzle vane 10 is not perpendicular to the chord direction of the nozzle vane, and the blade of the bearing housing side of the nozzle vane 10 is deviated to the upstream. Accordingly, according to the modified example, even when the bearing housing side of the nozzle vane 10 is provided to be close to the turbine impeller as in the nozzle vane 10 of the embodiment of the present invention shown in FIG. 2B, it is possible to more satisfactorily ensure a throat area for ensuring a capacity (a full-open capacity) of an exhaust gas supplied to the turbine impeller obtained when the nozzle vane 10 is rotated and in full-open state. Accordingly, this configuration can be appropriately used in the turbocharger of the embodiment of the present invention.

INDUSTRIAL APPLICABILITY

According to the turbocharger of the embodiment of the present invention, since the movement direction of the nozzle vane can be controlled, the turbine efficiency can be improved.

Then invention claimed is:

1. A variable capacity type turbocharger comprising:
   a bearing housing which rotatably supports a turbine impeller;
   a turbine housing which has a scroll passageway formed therein to supply an exhaust gas to the turbine impeller; and
   an exhaust nozzle which changes a flow rate and a stream angle of the exhaust gas supplied from the scroll passageway to the turbine impeller,
   wherein the exhaust nozzle includes a pair of exhaust introduction walls forming a passageway of the exhaust gas and a plurality of nozzle vanes disposed between the pair of exhaust introduction walls and supported to be rotatable around the turbine impeller, and
   wherein each nozzle vane includes a high-pressure wall surface facing the scroll passageway, the bearing housing side of the high-pressure wall surface is provided to be closer to the turbine impeller than the turbine housing side thereof, and when the turbine impeller rotates, the nozzle vane moves toward the turbine housing or is pressed toward the turbine housing side of the exhaust introduction wall so as to narrow a gap between the nozzle vane and the turbine housing side of the exhaust introduction wall among the pair of exhaust introduction walls.

2. The turbocharger according to claim 1, wherein (a thrust for moving the nozzle vane toward the turbine housing)/(a pressure surface projection area of the nozzle vane) is 0.02 to 0.05 [N/mm$^2$].

3. The turbocharger according to claim 1, wherein a hub-shroud average value of a nozzle passageway length ratio L/Wth (L denotes a length of the nozzle passageway and Wth denotes a width of an outlet of the nozzle passageway) is larger than 1.5.

4. The turbocharger according to claim 1, wherein a hub-shroud average value of a nozzle contraction ratio Win/Wth (Win denotes a width of an inlet of the nozzle passageway and Wth denotes a width of an outlet of the nozzle passageway) is smaller than 1.95.

5. The turbocharger according to claim 3, wherein a hub-shroud average value of a nozzle contraction ratio Win/Wth (Win denotes a width of an inlet of the nozzle passageway and Wth denotes a width of an outlet of the nozzle passageway) is smaller than 1.95.

6. The turbocharger according to claim 1, wherein a rear edge stacking line of the nozzle vane is parallel to the shaft of the turbine impeller.

7. The turbocharger according to claim 3, wherein a rear edge stacking line of the nozzle vane is parallel to the shaft of the turbine impeller.

8. The turbocharger according to claim 4, wherein a rear edge stacking line of the nozzle vane is parallel to the shaft of the turbine impeller.

9. The turbocharger according to claim 5, wherein a rear edge stacking line of the nozzle vane is parallel to the shaft of the turbine impeller.

10. The turbocharger according to claim 1, wherein an inclination angle of a rear edge of the nozzle vane at the downstream of the exhaust gas with respect to the shaft of the turbine impeller is different from an inclination angle of a front edge of a blade of the turbine impeller with respect to the shaft of the turbine impeller.

11. The turbocharger according to claim 1,
    wherein the exhaust nozzle includes a support shaft supporting the nozzle vane,
    wherein at least one of the pair of exhaust introduction walls is provided with a support hole rotatably supporting the support shaft, and
    wherein the support shaft is fixed to the nozzle vane through a flange portion protruding outward in the radial direction of the support shaft.

12. The turbocharger according to claim 1, wherein the high-pressure wall surface of the nozzle vane is a curved surface.

13. The turbocharger according to claim 11, wherein the high-pressure wall surface of the nozzle vane is a curved surface.

\* \* \* \* \*